United States Patent [19]

Whaley et al.

[11] 4,328,097
[45] May 4, 1982

[54] APPARATUS FOR FILTERING FRYING OIL

[76] Inventors: Bennie M. Whaley; Janice C. Whaley, both of 3872 Concord Blvd., Concord, Calif. 95419

[21] Appl. No.: 110,830

[22] Filed: Jan. 10, 1980

Related U.S. Application Data

[62] Division of Ser. No. 1,293, Jan. 5, 1979, Pat. No. 4,230,574.

[51] Int. Cl.³ ........................ B01D 35/28; A47J 37/12
[52] U.S. Cl. ...................................... 210/167; 99/408; 210/315; 210/416.1; 210/456; 210/486; 210/DIG. 8
[58] Field of Search ........ 210/167, 172, 193, 313–315, 210/416 R, 456, 461, 484–486, DIG. 8; 99/408

[56] References Cited

U.S. PATENT DOCUMENTS

| | | | |
|---|---|---|---|
| 1,985,411 | 12/1934 | Houck | 210/456 X |
| 2,610,740 | 9/1952 | Hunter | 99/408 X |
| 2,835,389 | 5/1958 | Sharp | 210/456 X |
| 3,159,095 | 12/1964 | Wagner | 210/167 X |
| 3,279,605 | 10/1966 | Shepherd | 210/486 X |
| 3,312,352 | 4/1967 | Shiells | 210/456 X |
| 3,543,935 | 12/1970 | Detrick | 210/315 X |
| 3,646,882 | 3/1972 | Keating | 99/408 |
| 3,707,907 | 1/1973 | Wilson et al. | 210/DIG. 8 |
| 4,043,916 | 8/1977 | Wecker, Sr. | 210/DIG. 8 |
| 4,113,623 | 9/1978 | Koether et al. | 210/486 X |

*Primary Examiner*—Robert H. Spitzer
*Attorney, Agent, or Firm*—Fitch, Even, Tabin, Flannery & Welsh

[57] ABSTRACT

An improved apparatus for filtering frying oil in a cooker apparatus includes the steps of adding diatomaceous earth to oil in the cooking vessel; draining the oil into a drain pan; drawing the oil through a filter positioned in said drain pan, such that said earth is deposited on the surface of said filter; and returning said oil to the cooking vessel. Thereafter, the oil is filtered by the steps of draining the oil into said drain pan such that the earth is not disturbed to any substantial extent off of the surface of said filter; drawing the oil through said filter; and automatically returning said oil to the cooking vessel.

The improved apparatus includes attaching said drain pan and filter to said cooker apparatus and positioning a metallic plate between the drain opening of said vessel and said filter such that the oil drained into said drain pan is initially deflected to prevent disturbing the diatomaceous earth deposited on the surface of said filter.

3 Claims, 3 Drawing Figures

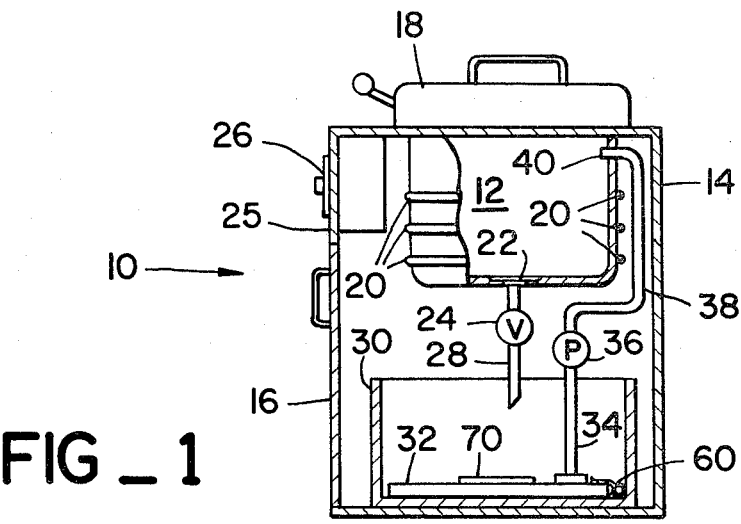
FIG_1
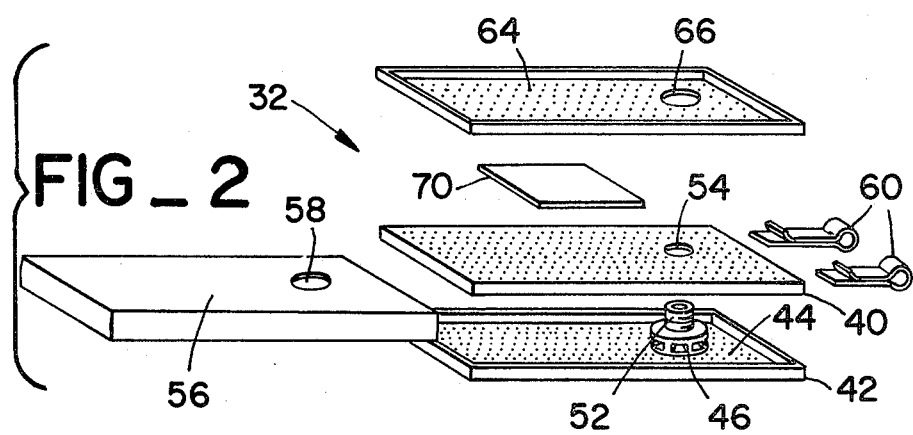
FIG_2
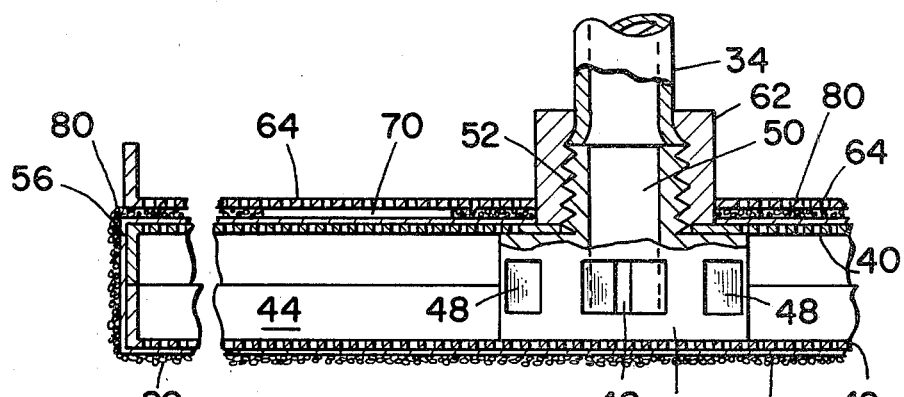
FIG_3

APPARATUS FOR FILTERING FRYING OIL

This is a division of application Ser. No. 1,293 filed Jan. 5, 1979, now U.S. Pat. No. 4,230,574.

BACKGROUND OF THE INVENTION

Most prior art oil fryer cooking devices do not include as part of their structure means for fully filtering the oil used therein. These devices required that a separate filter apparatus be connected temporarily to the cooker to provide complete oil filtering using diatomaceous earth filters or the like. Such diatomaceous earth filters enable the harmful solids and other smaller particulate debris in the oil to be removed when the oil is drawn through the filter. Disadvantages of such devices included the fact that with a filter separate from the cooker, the filtering process required that the hot oil be manually handled during filtering, a dangerous situation especially for untrained workers. Further, some of the oil is always lost during this process. Finally, the requirements of hooking up the filter apparatus to the cooker adds significant time to the filtering process, such that it is only normally done once or twice a day. Thus, the oil is not filtered sufficiently often to prevent build-up of impurities and solids, thereby causing the oil to break down and become unusable sooner than would otherwise be possible.

Other devices have made filters an integral part of the cooker apparatus, but these devices have had the disadvantage that the diatomaceous earth is not used in the filtering process, so that the filter acts more as a strainer rather than a complete filtering device. Thus only larger particulate matter, e.g. crumbs, are removed by such filtering.

Only one other cooker apparatus is known to use diatomaceous earth as an integral part of its structure. However, this apparatus has the drawback that the earth is added to the drain pan, not to the cooking vessel, and it apparently does not include means for preventing the oil from disturbing the earth after it has been deposited onto the surface of the filter during draining of oil into the drain pan. If a portion of the surface of the filter is exposed, the oil drawn through the filter at this point is not adequately filtered, thereby reducing the effectiveness of the filtering operation.

SUMMARY OF THE INVENTION

The present invention eliminates the above identified problems by providing an apparatus for filtering frying oil wherein the diatomaceous earth is mixed in with the oil while the oil is still in the cooking vessel. The oil is then drained into the drain pan; drawn through the filter means, including an envelope comprising filter paper or cloth of low porosity, such that the diatomaceous earth particles are trapped on the surface of the envelope; and then returned automatically to the cooking vessel. Thereafter, the oil is filtered by draining it into the drain pan in such a way that the earth on said filter means is not disturbed thereby. The oil is then drawn through the filter means and then returned automatically to the cooking vessel.

The improved apparatus includes a stainless steel plate or similar structure for deflecting the oil as it is drained into the drain pan to thereby prevent the disturbing of the earth deposited on the surface of said filter means.

Therefore, a principal object of the present invention is to provide a method and apparatus for filtering frying oil wherein the filter means is an integral part of the cooker apparatus, and wherein the filter means includes the use of diatomaceous earth which is not disturbed from the surface of the filter during the filtering process.

Another object of the present invention is to provide an apparatus for filtering frying oil wherein the filter is of a simple construction such that it is easily and readily assembled and disassembled for cleaning and changing of the filter media and for attachment of the filter and drain pan to the cooker apparatus.

A still further object of the present invention is to provide an automatic filtering apparatus, thereby eliminating the manual interaction of potentially unskilled workers with hot oil during the filtering process.

Another object of the present invention is to provide a method and apparatus for filtering frying oil wherein the amount of oil used up during the filtering process is substantially reduced over prior filtering devices.

These and other objects and advantages of the present invention will become more readily apparent upon reference to the accompanying drawings and the following description.

BRIEF DESCRIPTION OF THE DRAWINGS

FIG. 1 is a side elevational view of a cooker apparatus shown partly broken away and partly in section, and having a filtering means according to the present invention installed therein.

FIG. 2 is a diagrammatic exploded perspective view of the filter means used in conjunction with the present invention; and FIG. 3 is a partly broken away view of the filter means including oil deflection means according to the present invention.

DESCRIPTION OF A PREFERRED EMBODIMENT

A cooker apparatus having a filtering means according to the present invention installed therein is illustrated at 10 in FIG. 1. The cooking apparatus 10 includes a cooking vessel 12 mounted in a suitable housing structure 14 including a front door 16 and vessel lid 18. The oil normally retained in vessel 12 is heated by conventional heating elements 20 which may ring the vessel 12. The bottom of vessel 12 includes a drain outlet 22 which is opened or closed by means of a valve 24. Valve 24 is controlled in a conventional manner via controls 26 located on the front panel 25 of the cooker apparatus.

Positioned beneath outlet 22 is a drain pan 30. A conduit 28 connected to outlet 22 and valve 24 insures that fluid drained from vessel 12 enters drain pan 30. Thus, when valve 24 is opened, the hot cooking oil contained in vessel 12 drains through outlet 22 into drain pan 30 via conduit 28.

Positioned along the bottom of drain pan 30 is a filter means 32. A pump 36 positioned outside of said drain pan 30 is coupled to the filter means 32 by means of a conduit 34. The output of pump 36 is fed to vessel 12 via conduit 38 and return nozzle 40.

An exploded perspective view of the filter means 32 is illustrated in FIG. 2. The filter means 32 comprises a pair of filter screens 40, and 42 defined to be positioned operatively adjacent one another such that a hollow chamber 44 is defined therebetween. A spacer 46 is affixed to filter screen 42 in a centrally defined position with respect to the edges of said screen. The spacer 46 is of an annular shape having a width equal to the spacing between the two filter screens 40, 42 when said screens are positioned operatively adjacent one another.

A more detailed view of the spacer 46 is shown in FIG. 3, and illustrates the position of the annular portion thereof when the two filter screens 40, 42 are positioned thereabout. As can be seen, the spacer 46 includes at least one passage 48 extending from said hollow chamber 44 to the hollow interior 50 of said spacer 46. The spacer 46 is further defined to include a fastener portion 52 extending axially away from the annular flange portion of said spacer 46. The fastener portion 52 is defined to have an open end through which oil is designed to flow.

Referring again to FIG. 2, filter screen 40 is defined to include an opening positioned such that the fastening portion 52 of spacer 46 will extend therethrough when screens 40 and 42 are operatively positioned adjacent one another. A disposable filter element 56 is defined in a shape such that it will envelope screens 40 and 42, such that the surfaces of said screen plates 40, 42 are enclosed therein. Filter element 56 also includes a centrally located opening 58 defined in a position such that fastening portion 52 of spacer 46 will extend therethrough when filter element 56 is properly positioned about said screens 40, 42. Means for fastening the filter element 56 and the screen plates together may comprise clips 60 or other conventional fastening means.

Again referring to FIG. 3, to seal off the hollow chamber 44, a corresponding fastener 62 operatively positioned on conduit 34 is used to fasten said conduit 34 to spacer 46 by means of fastener portion 52. With fastener 52 tightened onto spacer 46, both filter element 56 and screen 40 are affixed to said spacer, to prevent oil from leaking through the respective openings 58 or 54. Thus, with the pump means operating, oil is caused to be drawn through the filter element 56, the filter screens 40, 42, and into hollow chamber 44. Thereafter, the oil flows through passage 48, hollow interior 50, and into conduit 34. The oil is ultimately returned to vessel 12 as described above.

FIG. 2 also illustrates that a crumb screen 64 may be provided for catching larger particulate matter as it flows into the drain pan 30 from the vessel 12, to thereby provide preliminary filtering of the oil. This helps prevent the excessive build-up of such particulate matter on the surface of the filter means 32. The crumb screen 64 may be mounted in a conventional manner in drain pan 30. FIG. 2 illustrates that with an opening 66 defined on said screen 64 in the required position, screen 64 may also be attached to spacer 46.

As seen in FIGS. 1 and 2, a key feature of the present invention is the providing of means for deflecting the oil as the oil is drained into drain pan 30 from vessel 12. Such means are required to protect the diatomaceous earth which normally exists on the surface of the filter means from being disturbed to any substantial extent during said draining. In the present embodiment, to provide said means, a stainless steel plate 70 is operatively positioned with respect to the surface of said filter means and the outlet opening of conduit 28 such that oil discharged from conduit 28 will strike said plate 70 prior to hitting the surface of said filter means. In the preferred embodiment, plate 70 is rectangular in shape. FIG. 2 illustrates the positioning of plate 70 with respect to the crumb screen 64 when such a screen is also a part of the present invention.

In operation, after oil has been added to the vessel 12, diatomaceous earth is added thereto and is mixed in to ensure that the earth is distributed evenly through the oil. Valve 24 is then opened, enabling the oil to drain into drain pan 30. Since filter element 56 is defined with a porosity such that the diatomaceous earth is trapped on the surface thereof, as the oil is drawn through the filter means out through spacer 46 and into conduit 34 the earth is caused to coat filter element 56. The pump means 36 then returns the oil to vessel 12 via conduit 38 and nozzle 40. The filter means now also includes a thin coating of the diatomaceous earth thereon, as illustrated at 80 in FIG. 3.

Thereafter, after the heated oil has been used in the cooking of one or more batches of food, the oil is filtered to ensure that all particulate matter and impurities are removed therefrom. To provide this periodic filtering, valve 24 is opened so that the oil is drained into drain pan 30 via conduit 28. Metallic plate 70 is positioned such that during this draining operation, the oil is deflected so that it does not splash directly onto the surface of said filter means. The pump means 36 is then actuated such that the oil is drawn through said filter means, and therewith said diatomaceous earth, to thereby filter the oil. The oil is then returned to vessel 12 via conduits 34 and 38 and nozzle 40. Further cooking of food is thus enabled to be performed.

Note that it is also contemplated as being within the scope of the present invention to have the means for deflecting the oil comprise a plurality of metallic elements positioned on the surface of the filter element 56. For example, if the oil splashed against conduit 34 as it flowed from conduit 28, a smaller plate 70 may be needed on both sides of conduit 34.

It is to be understood that the foregoing description is merely illustrative of a preferred embodiment of the invention and that the scope of the invention is not to be limited but is to be determined by the scope of the appended claims.

We claim:

1. In a deep fat fryer including a vessel for receiving cooking oil and food to be cooked; a drain opening at the bottom of said vessel; valve means for opening and closing said drain opening; a removable cover for closing off the top of said vessel; and heater means about said vessel for heating the cooking oil received therein, and improved apparatus for filtering said cooking oil comprising:

a drain pan positioned beneath said drain opening for receiving cooking oil therein;

a pair of filter screens positioned adjacent to each other in said drain pan and defining therebetween a hollow chamber; one of said screens including a centrally positioned opening;

a disposable filter element defined in a position such that the surfaces of said screen plates are enclosed therein, said filter element adapted to receive a coating of diatomaceous earth on its surface and defined with an opening at a position operatively adjacent said screen opening;

a spacer defined in a position in a central location between said screen plates, and affixed to the other of said screens, said spacer including a hollow interior and at least one passage extending between said chamber and said hollow interior, said spacer defined to include an open end and defined to extend through said opening in said one screen and corresponding opening in said filter element;

pump means operatively connected to said spacer for enabling the drawing of oil through said filter element and filter screen into said chamber and thereafter said hollow spacer, and further including conduit means for transferring said oil from said hollow spacer and into said vessel; and means for deflecting the oil as said oil is drained into said drain pan, including a plate member positioned directly below said drain opening and substantially adjacent said filter surface such that diatomaceous earth existing on said filter surface is not disturbed to a substantial extent during said draining.

2. The apparatus of claim 1 wherein said means for deflecting the oil comprises a metallic plate.

3. The apparatus of claim 1 further comprising a crumb screen operatively positioned between said drain opening and said filter element, to provide preliminary filtering of said oil.

\* \* \* \* \*

UNITED STATES PATENT AND TRADEMARK OFFICE
CERTIFICATE OF CORRECTION

PATENT NO. : 4,328,097
DATED : May 4, 1982
INVENTOR(S) : Bennie M. Whaley and Janice C. Whaley It is certified that error appears in the above–identified patent and that said Letters Patent are hereby corrected as shown below:

Column 3, line 34, "52" should be "62".

Column 4, line 38, after "limited" insert --thereto--.

Signed and Sealed this

Thirty-first Day of August 1982

[SEAL]

Attest:

Attesting Officer

GERALD J. MOSSINGHOFF

Commissioner of Patents and Trademarks